Oct. 26, 1937.    A. NOVICK    2,097,301
ENVELOPE MACHINE
Original Filed Aug. 11, 1932    11 Sheets-Sheet 1

INVENTOR
Abraham Novick.
BY Moses & Nolte
ATTORNEYS

Oct. 26, 1937.   A. NOVICK   2,097,301
ENVELOPE MACHINE
Original Filed Aug. 11, 1932   11 Sheets-Sheet 3
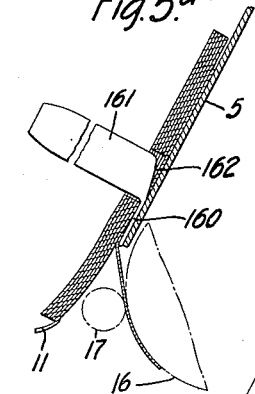
Fig.5ᵃ
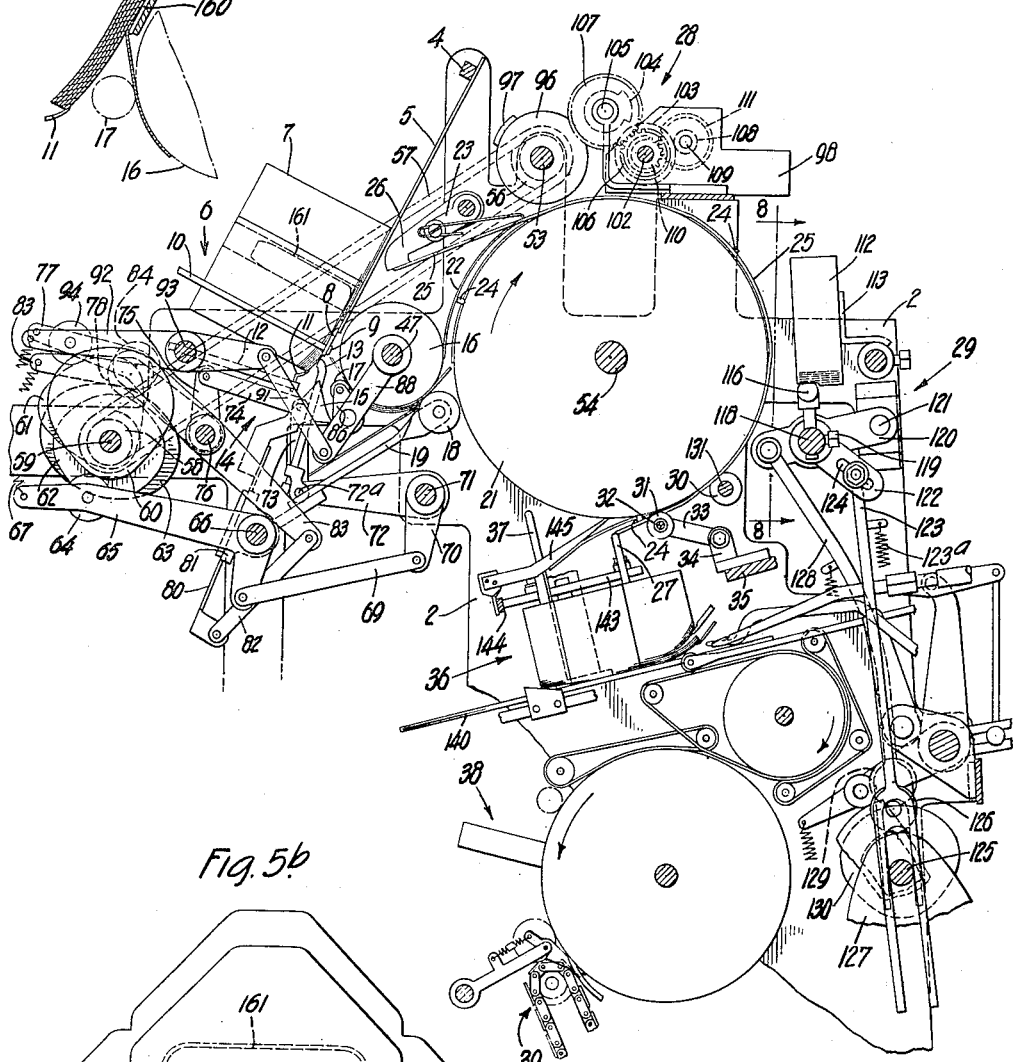
Fig.5
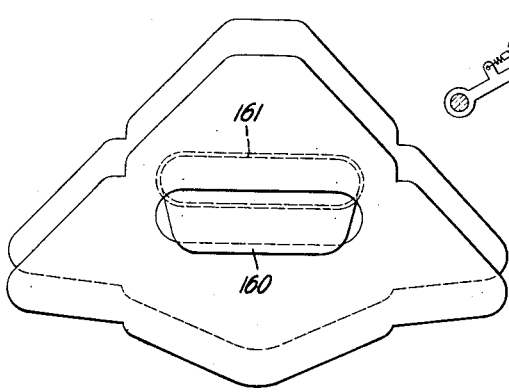
Fig.5ᵇ
INVENTOR
Abraham Novick.
BY Moses & Nolte
ATTORNEYS Oct. 26, 1937.  A. NOVICK  2,097,301
ENVELOPE MACHINE
Original Filed Aug. 11, 1932   11 Sheets-Sheet 4
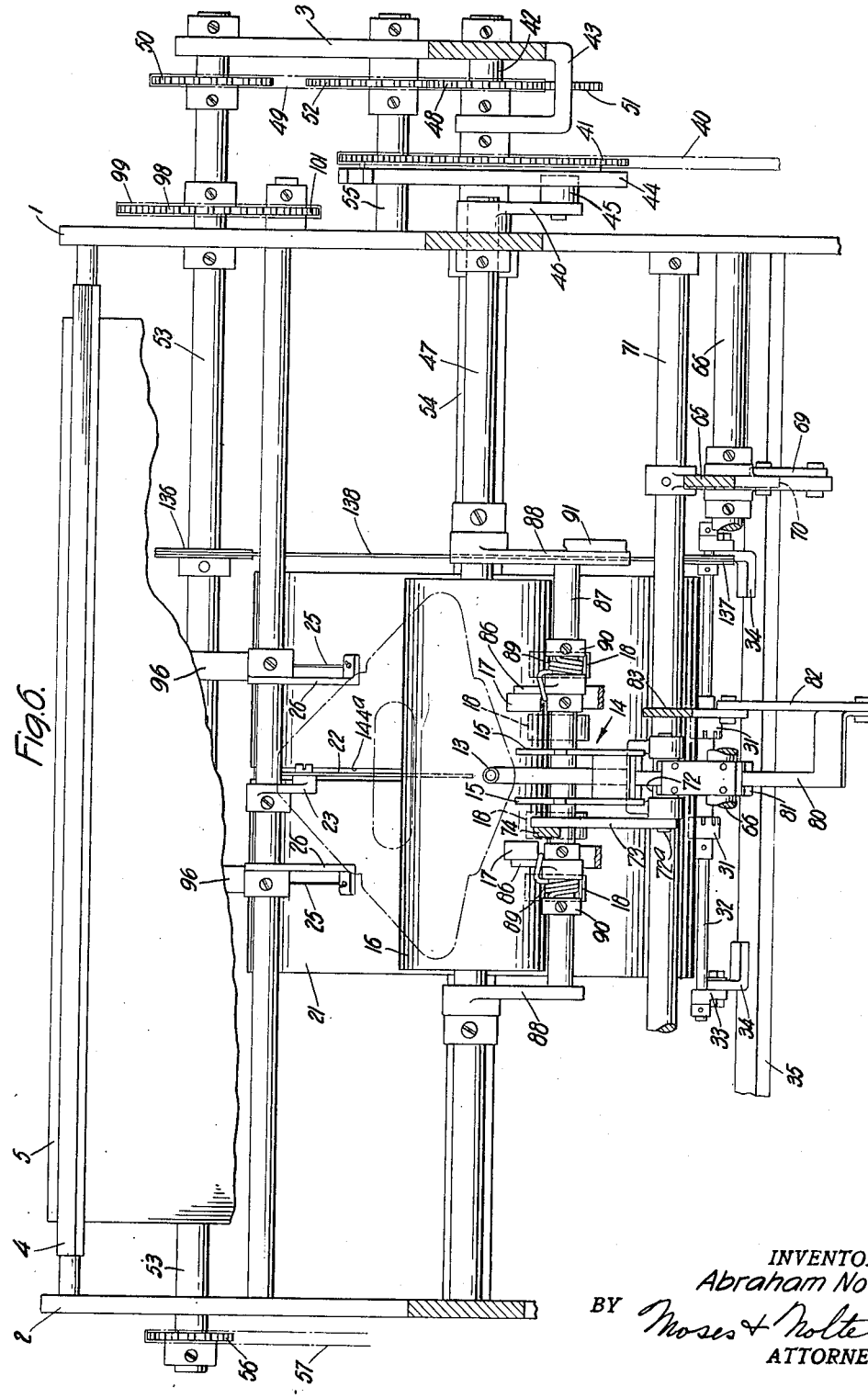
INVENTOR
Abraham Novick.
BY Moses & Nolte
ATTORNEYS

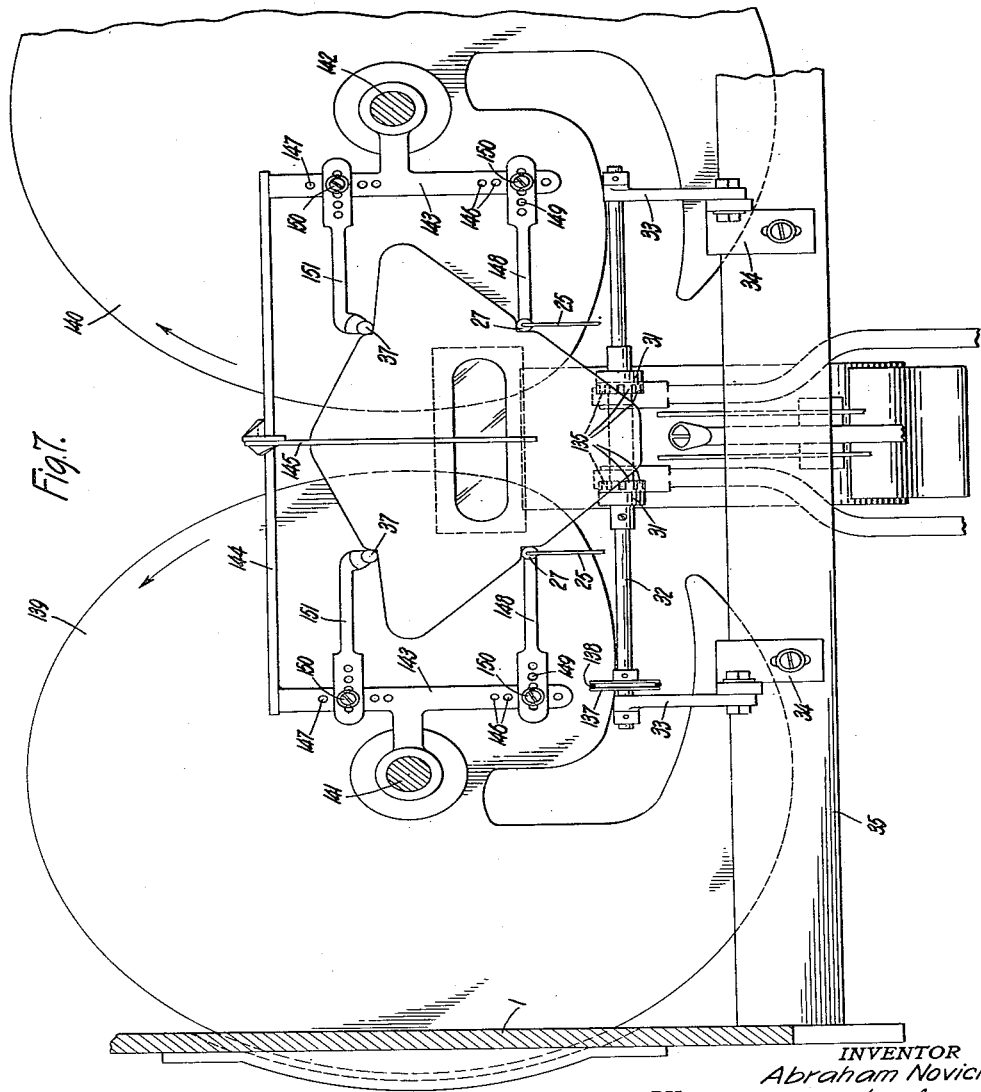

Oct. 26, 1937.  A. NOVICK  2,097,301
ENVELOPE MACHINE
Original Filed Aug. 11, 1932   11 Sheets-Sheet 6
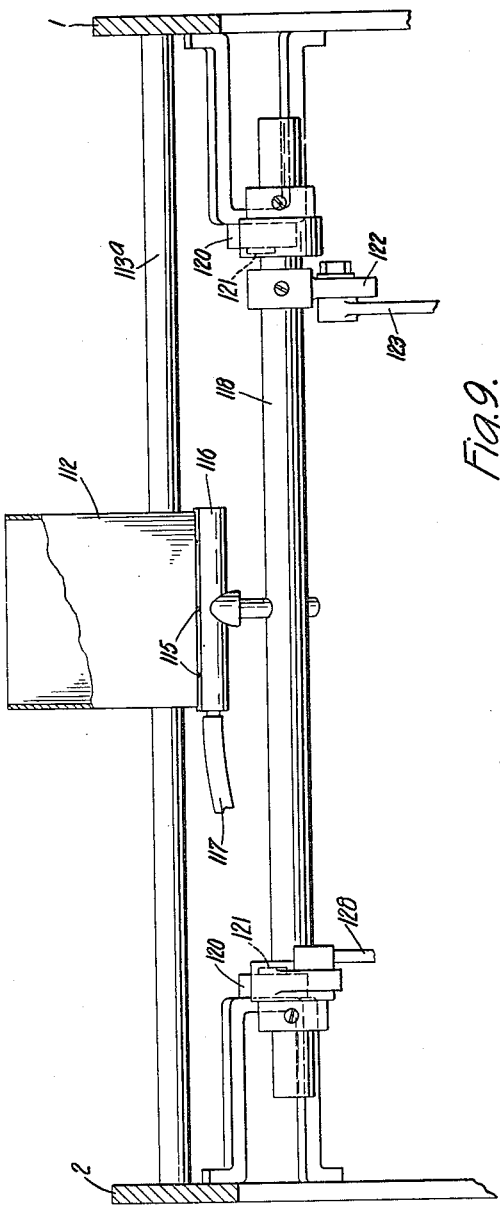
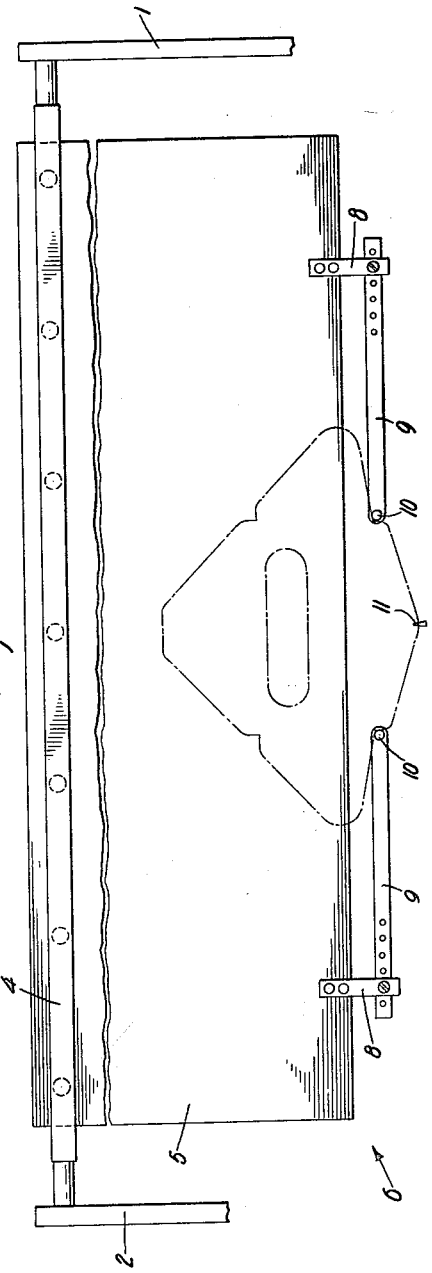
INVENTOR
Abraham Novick.
BY Moses & Nolte
ATTORNEYS

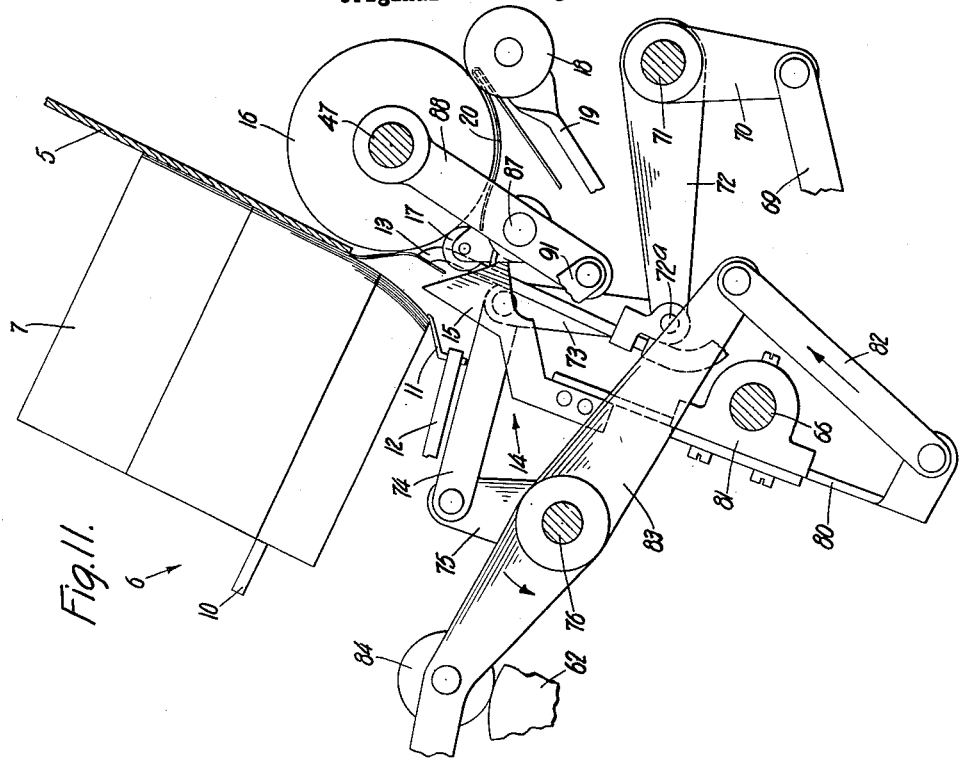

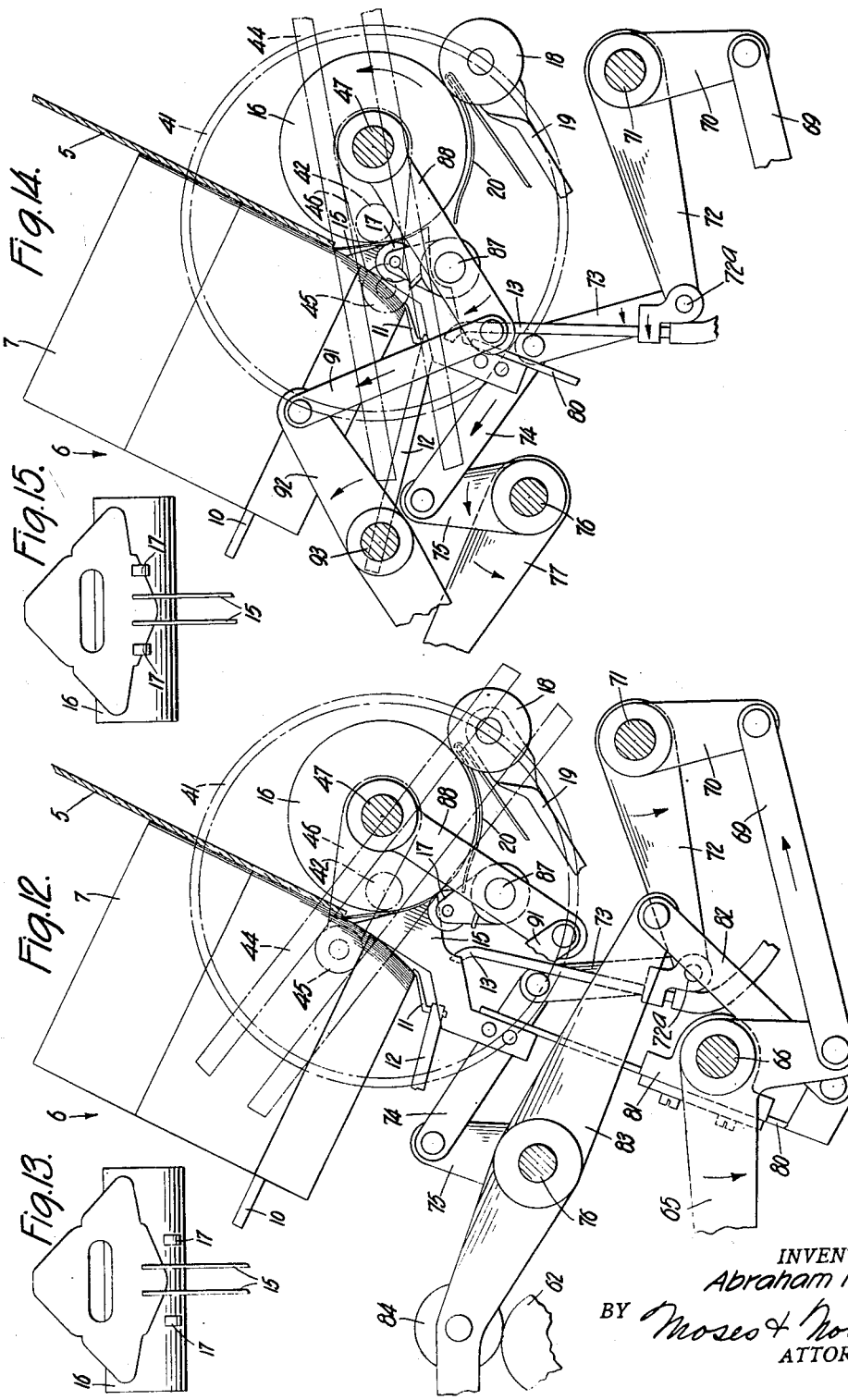
Oct. 26, 1937.  A. NOVICK  2,097,301
ENVELOPE MACHINE
Original Filed Aug. 11, 1932  11 Sheets-Sheet 8
INVENTOR
Abraham Novick.
BY Moses & Nolte
ATTORNEYS Oct. 26, 1937.   A. NOVICK   2,097,301
ENVELOPE MACHINE
Original Filed Aug. 11, 1932   11 Sheets-Sheet 9

INVENTOR
Abraham Novick.
BY Moses + Nolte
ATTORNEYS

Oct. 26, 1937.   A. NOVICK   2,097,301
ENVELOPE MACHINE
Original Filed Aug. 11, 1932   11 Sheets-Sheet 10

INVENTOR
Abraham Novick.
BY Moses & Nolte
ATTORNEYS

Oct. 26, 1937.  A. NOVICK  2,097,301
ENVELOPE MACHINE
Original Filed Aug. 11, 1932    11 Sheets—Sheet 11

INVENTOR
Abraham Novick.
BY Moses & Nolte
ATTORNEYS

Patented Oct. 26, 1937

2,097,301

UNITED STATES PATENT OFFICE 2,097,301

ENVELOPE MACHINE

Abraham Novick, Flushing, N. Y., assignor to F. L. Smithe Machine Co., Inc., New York, N. Y., a corporation of New York Application August 11, 1932, Serial No. 628,302
Renewed October 18, 1935

9 Claims. (Cl. 271—29)

This invention relates to envelope making machinery and has for an object to provide mechanism which is efficient and dependable in the making of window envelopes, and which is adaptable to a wide range of envelope sizes, and capable of operating to effect a high rate of output.

One object of the invention is to provide improved mechanism for separating envelope blanks one by one from the bottom of a stack and for advancing them in accurately aligned and timed relation past a patch applying station.

To the above end it is a feature of the invention that provision is made of a feed roll situated in proximity to the end of a stack of envelope blanks from which the blanks are to be separated one by one, of means for pressing the blanks successively against the feed roll, and of means for operating the feed roll continuously but at variable speed so that it will be operating at minimum speed at the time when it is required to withdraw a blank from the stack.

It is a further feature of the invention that the blanks are carried past the patch applying station on the surface of a cylinder and that the cylinder is provided with projecting pins adapted by engagement with the trailing edge of a blank to advance it from a state of rest and to advance it in definitely timed and aligned relation past the patch applying station.

It is a further feature of the invention that provision is made in conjunction with means for re-stacking the blanks to which patches have been applied of means for engaging the trailing edges of the blanks and pushing them downward to assure the depositing of each blank upon the blank which preceded it.

Other objects and advantages will hereinafter appear.

In the drawings forming part of this specification,

Figure 5 is a fragmentary, sectional side elevation showing a greater portion of the machine than is shown in Figure 1;

Figure 5a is a vertical section through the magazine containing the envelope blanks with the window openings therein;

Figure 5b is a view of the stack of blanks arranged in the magazine, looking from the end nearest the shelf of the magazine and showing one of the blanks being removed from the magazine;

Figure 6 is a sectional view showing a portion of the mechanism of Figure 1 as viewed from the left of that figure;

Figure 7 is a sectional plan view illustrating details of mechanism for re-stacking the blanks and for withdrawing the blanks from the second stack;

Figure 8 is a fragmentary, sectional, detail view, taken on the line 8—8 of Figure 5, and illustrating certain features of the patch applying mechanism;

Figure 9 is a fragmentary elevation showing details of the first blank magazine. The mechanism illustrated is broken away intermediate its ends for compactness of illustration;

Figure 10 is a fragmentary view in sectional side elevation, illustrating the mechanism for taking the blanks singly from the first magazine;

Figure 11 is a view similar to that of Figure 10 but with the section taken in a different plane and with the parts at a slightly different point in the cycle;

Figures 12 and 14 are also similar to Figures 10 and 11 and show the parts at successive steps in the cycle;

Figures 13 and 15 are diagrammatic plan views, illustrating the relationship of certain parts in the positions of Figures 12 and 14, respectively;

Figure 1:
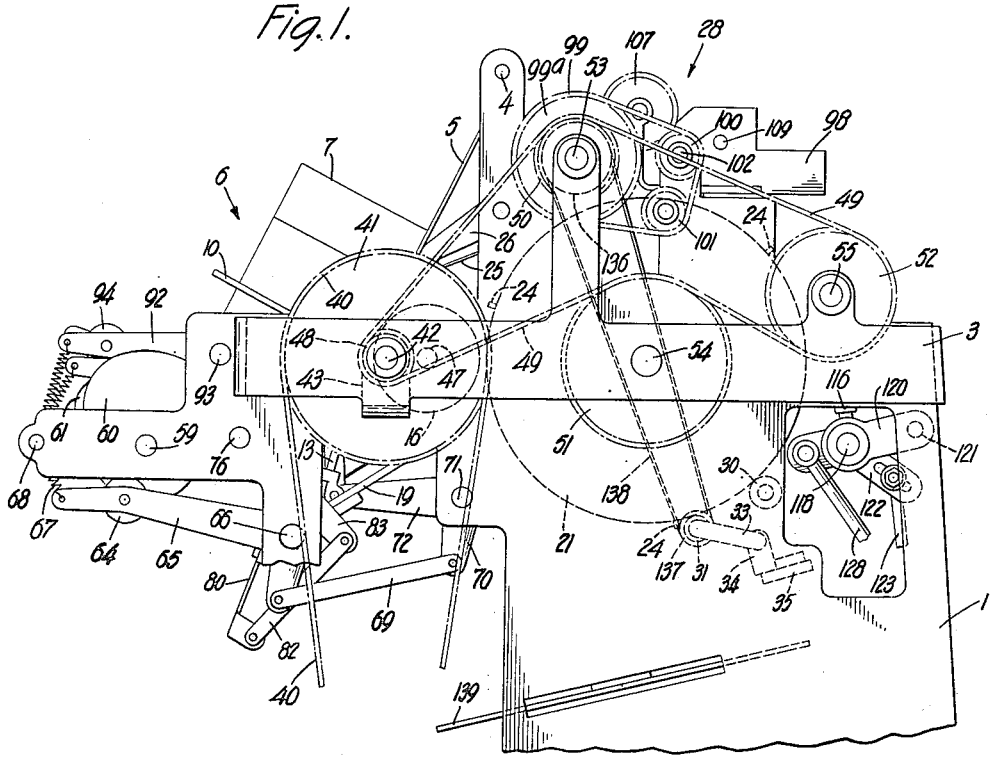
Figure 1 is a fragmentary view in side elevation illustrating a portion of the mechanism at the introductory end of the machine.
Figure 2:
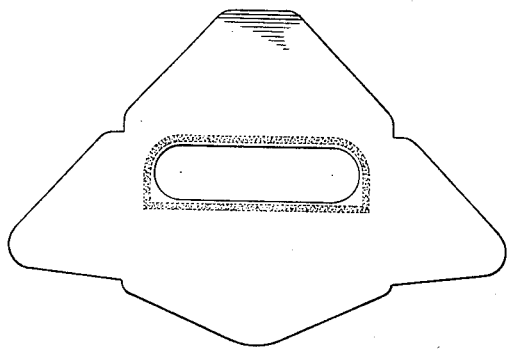
Figure 2 is a plan view of an envelope blank having the patch adhesive but no patch applied thereto.
Figure 3:
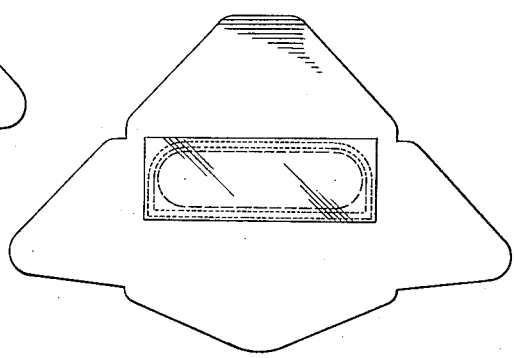
Figure 3 is a view similar to Figure 2 but showing a patch applied to the envelope blank.

The machine will first be described in a general way in order that a comprehensive idea of the principal parts and of the mode of operation may be had, and a more complete detailed description will then be given.

The machine includes a frame which comprises main side frame members 1 and 2 and an auxiliary side frame member 3. A cross bar 4 supported between the main frame members 1 and 2 supports a downwardly extending shelf 5 which forms the bottom or floor piece of a magazine 6 in which a stack 7 of window envelope blanks is placed. Arms 8 (Figures 5 and 9) fixed on the shelf 5 adjustably support inwardly reaching arms 9 and the latter arms have fixed at the inner ends thereof pins or rods 10 which extend outward substantially at right angles to the plane of the shelf 5. The envelope blanks of the stack 7 rest upon the pins 10, the pins 10 being so adjusted in position that they engage the blanks at the junctions of the sealing flap with the end flaps. The pins 10 are situated some little distance below the lower edge of the shelf 5 and the sealing flaps extend downward for a further distance below the pins 10 (Figures 5, 10–12, 14 and 16). The lower face of the bottom blank of the stack, therefore, presents an exposed margin upon which separating and feeding instrumentalities may operate. A supporting finger 11 (Figure 5) fixed at the outer end of a stationary rod 12 engages the sealing margin of the bottom blank and assists in supporting the stack and preventing the release of more than one blank at a time.

A suction picker 13 is mounted and operated to move into engagement with the exposed margin of the bottommost blank, as in Figure 5, then to move away from the stack to draw the edge of the bottommost blank past the supporting or detaining finger 11 to the position in Figure 10. While the picker 13 holds the margin of the blank thus separated from the main part of the stack, a separator 14 comprising a pair of dagger members 15 is moved forward into the space between the stack and the partially separated blank to move the edge of the partially separated blank into proximity to a feed roller 16 (Figures 11 and 12). After the separator members 15 have entered the space between the stack and the margin of the bottom blank, the suction picker 13 is withdrawn longitudinally of the plane of the blank to permit the blank to clear it. The dagger members 15 press the margin of the blank close to but not into gripped engagement with the roller 16 (Figure 12). Auxiliary rollers 17 which run constantly in engagement with the roller 16 are moved from the position in Figure 12 over the margin of the blank, to the position in Figure 14, while such margin is held in the position described by the dagger members.

Figure 18:
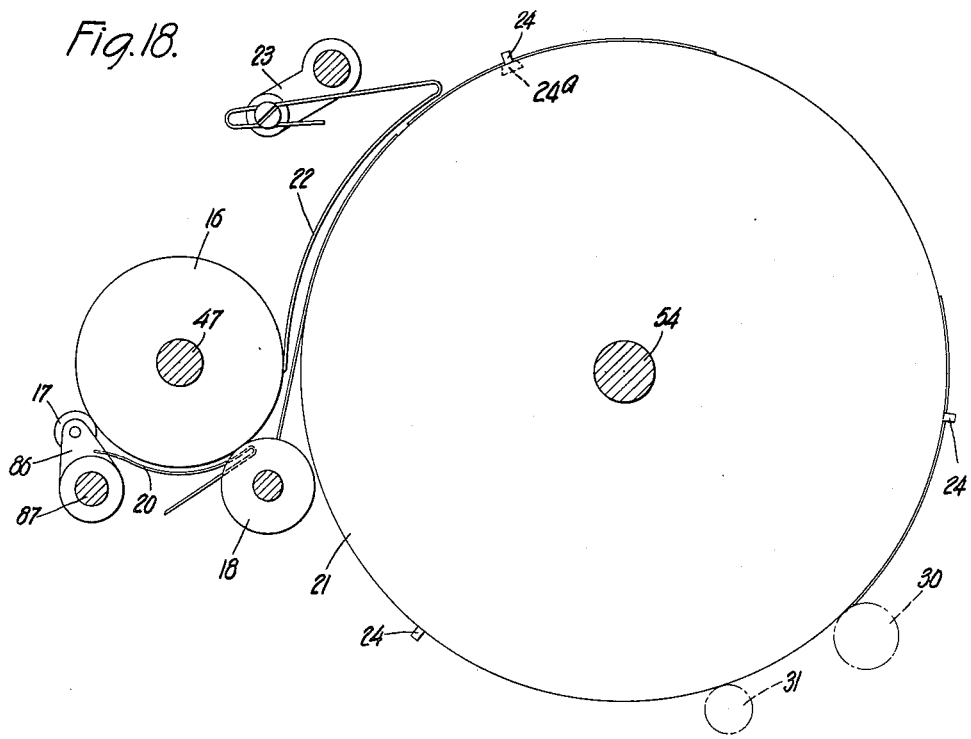
Figure 18 is a detail view in sectional side elevation illustrating details of the blank feeding mechanism at one stage of operation.

The roller 16 is continuously rotated, though at a variable speed. At the moment when the blank is first pressed against the roller 16 by the rollers 17, the roller 16 is rotating at its minimum speed and hence is enabled to draw the blank away from the bottom of the stack without liability of causing slipping or tearing. Two sets of rollers 18, rotatably mounted in fixed position, each set comprising two rollers supported on one end of a stationary arm 19 and located at opposite sides thereof, co-act with the roller 16 to advance the blank to the position illustrated in Figure 18. A stationary guide 20 extends around the roller 16 and guides the blank into the bight formed by rollers 16 and 18.

There are three sets of pins 24, and the pins of each set are located just inside guides 25. The pins 24 of each set are supported on individual dove-tail blocks 24a, Figure 18, adjustably supported in a dove-tail slot in the cylinder 21 and extending axially thereof.

Figure 19:
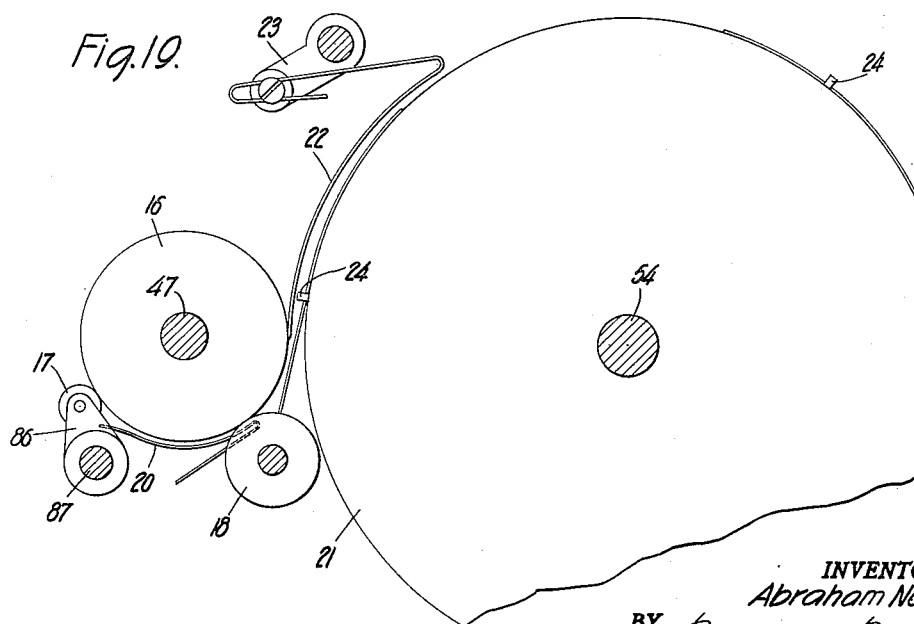
Figure 19 is a view similar to Figure 18, illustrating the same parts at a different stage of operation.

The rollers 16 and 18 feed the blank against the periphery of a large cylinder 21 and beneath a guide 22 which is fixed upon a stationary arm 23 (Figures 4, 5, 6 and 16). When the blank reaches the position of Figure 18 it is not driven forward but stands at rest until a pair of pins 24 carried by the cylinder 21 have advanced to the position illustrated in Figure 19. At this point the pins 24 engage the trailing edge of the blank in the angles formed between the end flaps and the bottom flap thereof. The blank is then driven forward with the drum by the pins 24. In the illustrative machine there are three pairs of the pins 24 located upon the periphery of the cylinder 21. The cylinder 21 is driven uniformly and at a speed such that it travels through one-third of a revolution for each complete cycle of the blank separating mechanism.

The blank is carried forward by the cylinder 21 and the pins 24 beneath guide strings or wires 25 which extend part way around the cylinder and which are connected at their opposite ends to fixed arms 26 and to fixed posts 27 (Figures 4, 5, 6, 7 and 16). The wires 25 are spaced laterally from one another by a distance sufficient to leave clear all that central area of the envelope bank to which the patch is to be applied.

The cylinder 21 carries the blank past a gumming mechanism 28 and then past patch applying mechanism 29 (see particularly Figures 1 and 5). After the patch has been applied the blank travels past fixed feed rollers 30 and then over cylindrical feed rollers 31 which are toothed at their inner ends as shown best in Figure 7.

The rollers 31 are fast upon a shaft 32 journalled in the outer ends of arms 33, which arms are mounted with capacity for angular adjustment upon brackets 34. The brackets 34 are mounted with capacity for horizontal adjustment upon a cross bar 35 (see particularly Figure 7). The blank comes into position to be deposited in a second magazine 36 at the same time that its trailing edge comes into position to be engaged by the teeth of the rollers 31. That is, the blank is arrested in its forward movement by upright posts 37 of the magazine 36 and is in position to clear the upright posts 27 of magazine 36. The rollers 31 are driven at a considerably higher speed than the peripheral speed of the cylinder 21 and act to push forward and downward the trailing edge of the blank, thus assuring that it will be depressed before the leading edge of a following blank has reached the rollers 31.

The blanks are delivered patch side down to the second magazine and in a condition to be taken from the second magazine bottom edge first (not sealing edge first as they were taken from the first magazine).

The blanks deposited in the second magazine are taken singly from the bottom of the stack in fanned-out relation and are fed past a fan-out gummer 38 and onto a drying conveyor 39. They pass thence to other instrumentalities (not shown) for scoring the boundary lines of the body portion and for folding and adhesively uniting the end flaps and the bottom flap in the usual manner.

The machine parts will now be described in greater detail.

Figure 4:
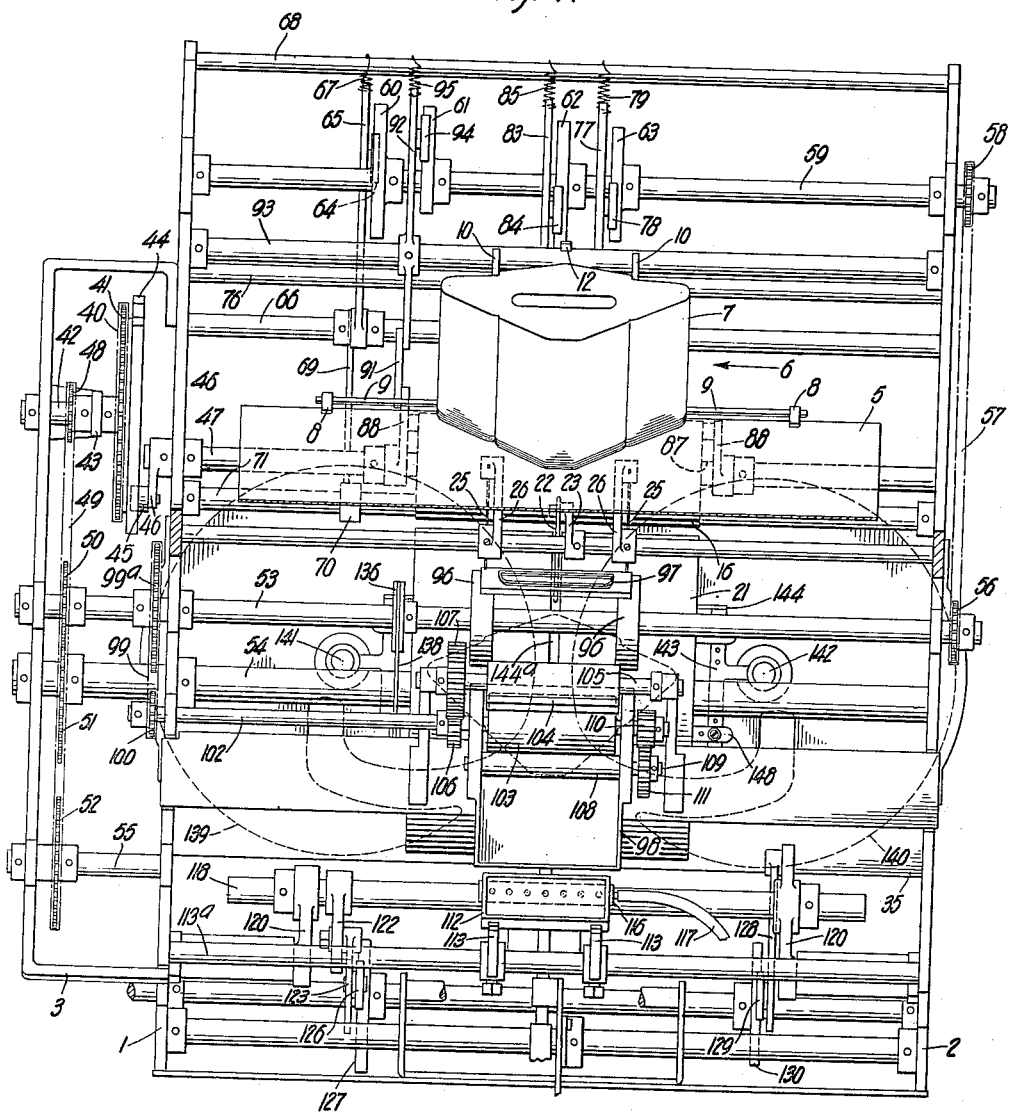
Figure 4 is a plan view of the portion of the machine illustrated in Figure 1.
Figure 16:
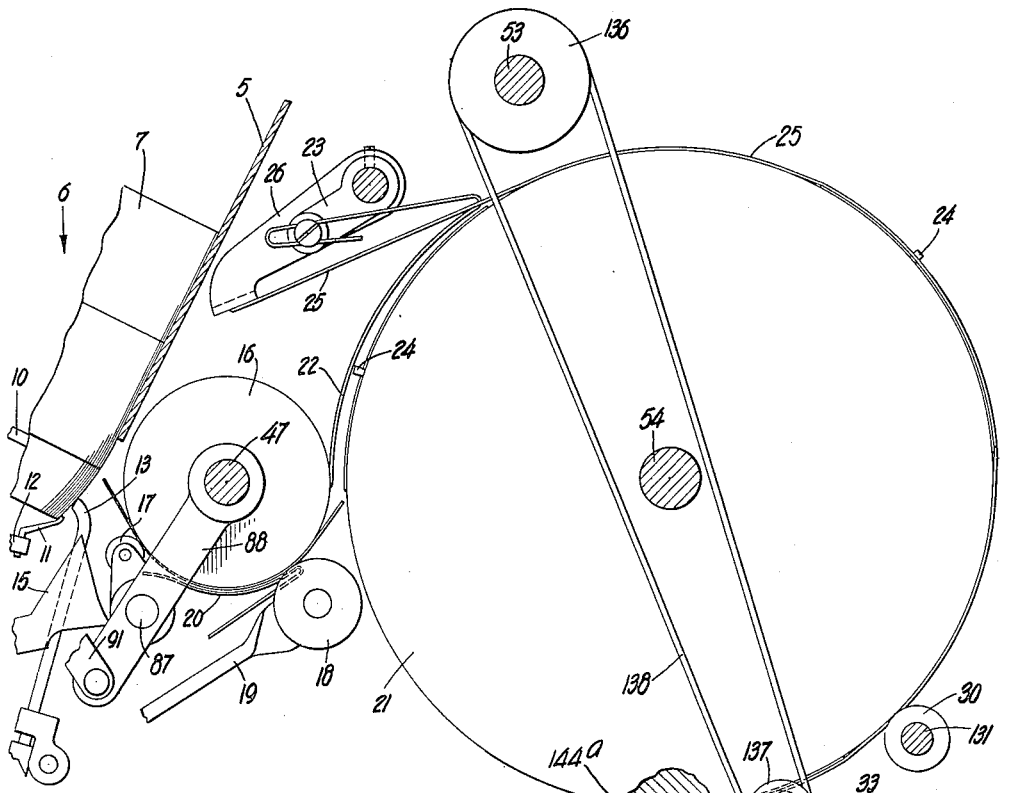
Figure 16 is a view in sectional side elevation illustrating particularly the means whereby the blanks are advanced past the patch applying mechanism and are re-stacked.
Figure 17:
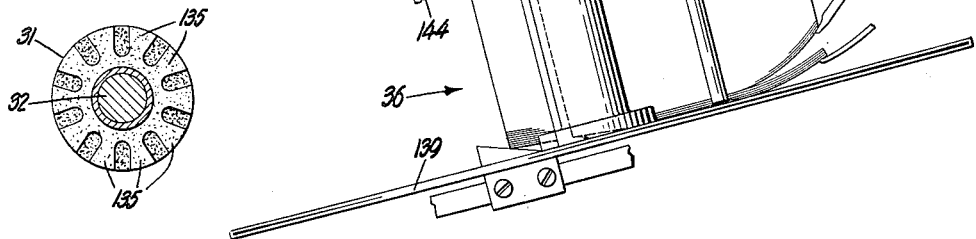
Figure 17 is a vertical, sectional view showing particularly a roller employed in effecting the re-stacking of the blanks.

A driving chain 40 (Figures 1, 4 and 6) runs upon and drives a sprocket 41 which is fast on a shaft 42 journalled in frame member 3 and in a bracket 43 carried by said frame member. The sprocket 41 has fast upon it a diametrically extending track member 44 (Figures 4, 12 and 14). A roller 45 at the outer end of a crank 46 fast on shaft 47 runs in the trackway of the member 44. The roller 16 is fast upon the shaft 47 and is driven by the described connections through one complete revolution at each complete revolution of the sprocket 41, or in other words, in each cycle of operations of the machine. It will be observed that the shafts 42 and 47 are not concentrically related (Figures 1, 4, 12 and 14) and that the roller 45 moves in and out along the trackway between a point near the center of shaft 42 and a point relatively remote therefrom with the result that the speed of the roller 16 varies substantially. It is at the time when the rollers 17 have just pressed a blank against the roller 16, as illustrated in Figure 14, that the roller 45 is nearest to the axis of shaft 42. Hence the roller 16 is travelling at this moment at its minimum speed.

The shaft 42 has a sprocket 48 fast upon it (Figures 1 and 4). A chain 49 runs upon sprocket 48 and upon sprockets 50, 51 and 52 fast, respectively, upon shafts 53, 54 and 55. The shaft 55 is a mere idler shaft. The shaft 54 has the cylinder 21 fast upon it. The arrangement is such that the cylinder 21 makes one-third of a revolution in each cycle of the machine, that is, one-third of a revolution for each revolution of shaft 42.

The shaft 53 extends completely across the machine and serves to drive various intrumentalities. A sprocket 56 fast on the shaft 53 acts through a chain 57 and a sprocket 58 to drive a cam shaft 59. The cam shaft 59 has fixed upon it cams 60, 61, 62 and 63. The cam shaft makes one revolution for each cycle of operations.

A follower 64 (Figures 1, 4 and 5) runs against the lower side of cam 60. This follower is carried by a bell-crank 65 journalled on a shaft 66. A spring 67 connected to one end of the bell-crank 65 and to a cross rod 68 maintains the follower 64 at all times in operative engagement with the cam 60. The bell-crank 65 is connected through a link 69 with a crank 70 fast on a shaft 71. The shaft 71 also has fast upon it a crank 72 upon which the picker 73 is pivotally mounted by a shaft 72a. Rocking movement imparted through the described operating train to the shaft 71 is effective to carry the point of pivotal support, shaft 72a, of the picker about the axis of shaft 71. Provision is also made to rock the picker about its own shaft 72a. To this end, provision is made of an arm 73 (Figures 4, 12 and 14) fast with the picker through the shaft 72a. A link 74 is connected to said arm and to a crank 75 fast on a shaft 76. An arm 77 is also fast upon shaft 76 and this arm carries a cam follower 78 which co-acts with cam 63 to rock the picker toward and from the stack at proper times in the cycle. A spring 79 connected to the arm 77 and to rod 68 maintains the cam follower 78 in operative engagement with the cam 63 at all times.

The dagger members 15 are carried by a slide 80 which is supported and guided in a guide block 81 (Figures 5, 11 and 12) mounted on shaft 66. The tail of slide 80 is connected through a link 82 with one end of a rocking lever 83 which is journalled on shaft 76. The opposite end of the rocking lever 83 carries a cam follower 84 which rides upon cam 62. A spring 85 connected to the rocking lever 83 and to the rod 68 maintains the follower 84 at all times in cooperative engagement with the cam 62. The cam 62 through the described connections is effective to impart to the daggers the operative movements already described.

The rollers 17 are journalled upon the outer ends of arms 86 which are rockingly mounted upon a short shaft 87 (Figures 4, 5 and 6). The shaft 87 in turn is fixedly mounted in cranks 88, the cranks in turn being rockably mounted upon shaft 47. Coil springs 89 encircle the shaft 87. Each spring is connected at one end to a collar 90 fast on shaft 87 and at the opposite end to one of the arms 86. The springs 89 act against the arms 86 to maintain the rollers 17 pressed against the roller 16. One of the cranks 88 is connected through a link 91 with one end of a lever 92 which is rockably mounted upon a shaft 93. The opposite end of the lever 92 carries a cam follower 94 which rides upon cam 61. A spring 95 connected to the lever 92 and to the rod 68 maintains the follower 94 in operative engagement with the cam 61 at all times. The cam 61 is effective through the described train of connections to oscillate the rollers 17 to and fro upon the surface of roller 16 in the manner and for the purpose already described.

Each blank as taken up by the drum 21 is carried past the gumming mechanism 28 (Figures 1, 4 and 5). This mechanism comprises two discs 96 fast on shaft 53. The discs 96 carry a gum applying segment 97 for applying gum to portions of the envelope blank bordering the window opening. Provision is also made of means for transferring gum from a gum pot 98 to the segment 97. The shaft 53 has fast upon it a sprocket 99a, which, through a chain 99, drives sprockets 100 and 101. The sprocket 101 is an idler sprocket. The sprocket 100, however, is fast upon a shaft 102 which extends through the gum pot 98 and which has a gum take-up roller 103 situated in the gum pot and fast upon it. The gum take-up roller 103 is adapted to engage a gum transfer segment 104 fast on a shaft 105. Gears 106 and 107 fast, respectively, upon the shafts 102 and 105 drive the latter shaft from the former. A wiper roller 108 fast on a shaft 109 is journalled in the upper portion of the gum pot 98, and is arranged constantly to run in engagement with the gum take-up roller 103. Gears 110 and 111 fast, respectively, upon shafts 102 and 109 drive the latter shaft from the former. The peripheral speed of the wiper roller 108 is very much less than that of the gum take-up roller 103.

Figure 20:
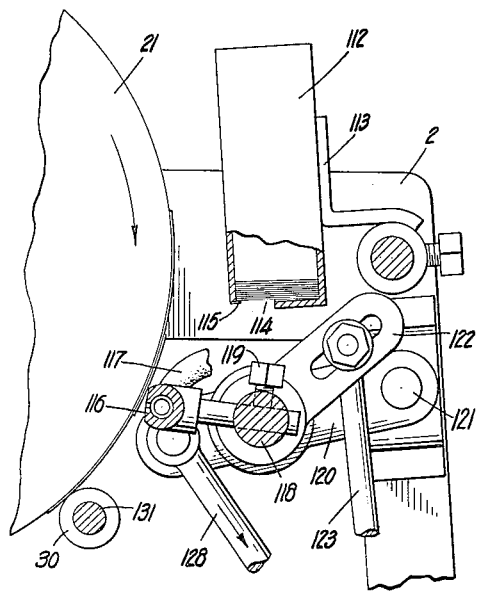
Figure 20 is a fragmentary, sectional side elevation, partly broken away, showing certain features of the patch applying mechanism.
Figure 21:
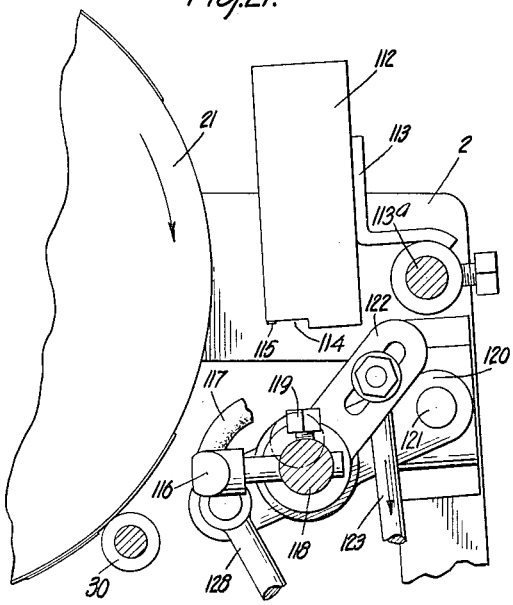
Figure 21 is a view generally similar to Figure 20 but showing the parts at a different stage in the cycle of operations.
Figure 22:
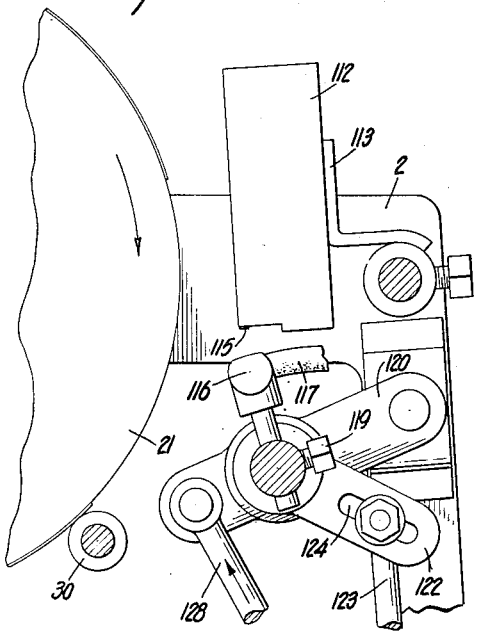
Figure 22 is still another view similar to Figure 20 but showing the parts at still another stage in the cycle of operations.
Figure 23:
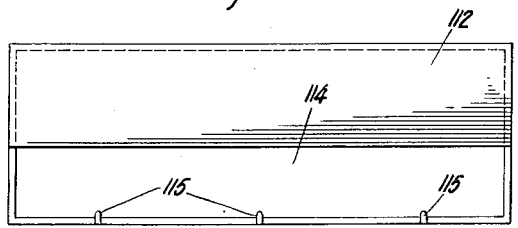
Figure 23 is a bottom plan view of the patch magazine on a larger scale than Figures 20 to 22.
Figure 24:
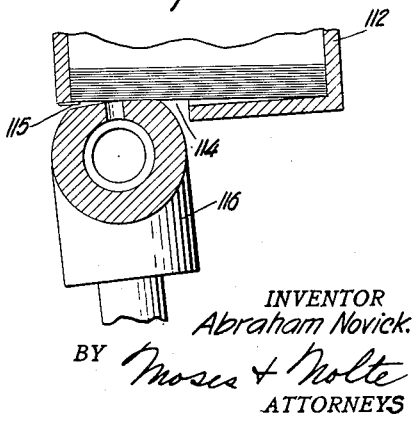
Figure 24 is a sectional, detail view of the patch magazine and the head of the patch transferrer, the view being on a somewhat larger scale than Figure 23.

After passing the gum applying mechanism each blank is carried past the patch applying mechanism 29 (Figures 1, 4, 5, 8, and 20 to 24). This mechanism comprises a patch magazine 112 mounted upon a stationary bracket 113 secured to a rod 113a. The magazine 112 has a wide slot 114 provided in the bottom thereof and fingers 115 jut out a short distance across a portion of the slot to support the patch blanks. A suction patch transferrer 116 connected to a suitable source of suction through a hose 117 moves to position to take the lowermost blank from the stack in the magazine and to carry such blank over against an envelope on the cylinder 21. The patch transferrer 116 moves to the position illustrated in Figures 1 and 24 to take hold of the bottom blank in the magazine. It then swings counter-clockwise in a substantially arcuate path into position to apply the patch carried by it to the gummed envelope blank. The patch transferrer moves into and through patch applying position at the peripheral speed of cylinder 21. The patch transferrer is shown in Figure 20 as having moved a little beyond patch applying position. From the position of Figure 20 the patch transferrer is swung farther downward, being at the same time backed away from the cylinder 16, as in Figure 21. The patch transferrer is next swung upward through a substantially arcuate path to the position of Figure 22, and is then thrust bodily upward to substantially the position of Figure 24 for a repetition of the cycle.

The patch transferrer 116 is fixed in adjusted position upon a shaft 118 by means of a set screw 119. The shaft 118 is rotatably carried in arms 120. The arms 120 are rockably mounted upon fixed stub shafts 121. Provision is made of means for swinging the arms 120 about the axis of shafts 121 to impart bodily movement to the patch transferrer 116, and of means for rocking the shaft 118 on said arms 120 to impart rotary movement to the transferrer 116. The means for imparting rotary movement to the transferrer comprises a slotted arm 122 fast on shaft 118 and a fork 123, the upper end of which is pivotally connected to the arm 122. The point of pivotal connection may be adjusted along the slot 124 of arm 122 but is adapted to be fixed in adjusted position. The lower end of the fork 123 embraces a cam shaft 125. Just above the furcations of the fork a roller 126 is journalled and this roller rides upon a cam 127 fast on the shaft 125. The roller 126 is held by a spring 123a connected to the link 123, against the cam 127 so that the cam and spring are effective to reciprocate the fork 123 in a substantially vertical direction. Rocking movement is imparted to the arm 120 by means of a fork 128. The fork 128 is pivotally connected at its upper end to one of the arms 120 and at its lower end embraces the cam shaft 125. The fork 128 has a roller 129 journalled in it which rides upon a cam 130 fast upon the cam shaft 125. The cams 130 and 127 are effective to move the patch transferrer through the described series of movements once in each cycle of the machine.

The pressing roller 30, carried by a shaft 131, runs in contact with the roller 21 and serves to press the applied patch smoothly and firmly against the envelope blank. After passing the pressing roller 30 the blank is deposited on the top of the stack in magazine 36. In travelling to the magazine the blank passes between the roller 21 and the rollers 31 (Figures 1, 5, 6, 7, 16 and 17).

The rollers 31 are fast on the shaft 32 which is journalled in the adjustable arms 33 carried by the fixed brackets 34 as previously described. The arms 33 are desirably so adjusted that the rollers 31 stand close to the roller 21 but do not co-act with the roller 21 to grip the blank. The rollers 31 are driven at a substantially higher peripheral speed than the roller 21 and they are so situated that the trailing edge of a blank stands in contact with them just as its forward movement is arrested by engagement of its leading edge with the posts 37 of magazine 36. The rollers 31 are provided with teeth 135 which engage the trailing edge of the blank and push it quickly forward and downward to assure a clear path for the next succeeding blank.

The shaft 32 is driven from shaft 53 by means of a pulley 136 fast on shaft 53, a pulley 137 fast on shaft 32, and a belt 138 trained on said pulleys.

The second magazine comprises supporting and separating discs 139 and 140 which are mounted upon shafts 141 and 142, respectively, and which are constantly driven in opposite directions. The shafts 141 and 142 jointly support a frame comprising side members 143 and a back member 144. The back member 144 supports a stripping finger 145 which extends upward and into a groove 145a of the cylinder, Figure 16, for intercepting the blanks and deflecting them downward away from the roller 21. The side members 143 have front and rear series of holes 146 and 147, Figure 7, provided in them. Inwardly reaching arms 148, also provided with a plurality of holes 149, are adapted to be secured upon the arms 143, each by means of a screw 150 passed through one of the openings 149 and threaded into one of the openings 146. Each arm 148 carries at the inner end thereof one of the vertically extending posts 27. The posts 27 extend both upward and downward from the arms 148.

Inwardly reaching arms 151 are similarly mounted on the side members 143 and carry at the inner ends thereof the posts 37. The posts 37 extend both upward and downward from the arms 151.

From the foregoing it will be understood that posts 27, 37, guides 25, and the pins 24 are adjustable sidewise of the machine for envelope blanks of different widths. It should also be understood that the machine is adjustable so that gum and the patch may be applied sooner or later in accordance with the length of the envelope blank and according to the position of the window thereon.

The mechanism for separating the blanks one by one from the bottom of the second stack, for arranging them in fanned-out relation, for conveying them, and gumming and drying them in fanned-out relation, are all the same as the corresponding parts disclosed in Letters Patent of the United States, #1,808,706, granted to me June 2, 1931, for Feeding mechanism for envelopes and the like. Since the construction and operation of these parts is well understood, no detailed description is deemed necessary. It may be remarked, however that the timing parts of the second separating mechanism are controlled from the cam shaft 125 which is driven in unison with the cam shaft 59.

It has been found that, at times, the upper edge of the window opening in the blank being removed from the magazine 6 catches on or collides with the lower edge of the window opening in the next adjacent blank, thus interfering with the removal of, or tearing the blanks.

To prevent this there is provided a guard or protector 160 in the form of a lip extending downwardly from a body part 161 located in the aperture formed by the window openings of the superposed blanks of the pack 7 in the magazine 6 (Figures 1, 5a and 5b).

The lip 160 extends downwardly between the shelf 5 and the blank nearest thereto, and the bottom face 162 of the body part 161 is inclined so that the upper edge of the window opening on a blank being removed is readily guided downwardly behind said body part and it then advances between the lip 160 and the shelf 5. Since the lip 160 extends over the bottom edge of window opening in the next adjacent blank, it is protected thereby and thus prevents collision therewith of the upper edge of the window opening in the blank being removed.

The body part 161 has substantially the same shape, in cross-section, as the window openings in the envelope blanks and the end thereof opposite the tongue 160 is tapered slightly so that the envelope blanks may be readily impaled thereon when a new supply of blanks is placed into the magazine.

I have described what I believe to be the best embodiment of my invention. I do not wish, however, to be confined to the embodiment shown, but what I desire to cover by Letters Patent is set forth in the appended claims.

I claim:

1. In an envelope machine, in combination, means for supporting a stack of blanks, means for separating a margin of the end blank of the stack, said means operating on the stack with the edges of the blanks in alignment with each other and serving to deflect the edge of the end blank from the stack without shifting the blank bodily in the plane of the stack, a feed roll, means for driving the feed roll continuously but at variable speed, and means for pressing the separated blank margin against the feed roll when the feed roll is operating at relatively low speed to cause the blank to be pulled from the stack.

2. In an envelope machine, in combination, means for supporting a stack of blanks, a feed roll, means comprising a member operative on the outer surface of the end blank of the stack for separating a margin of such end blank from the stack and pressing it against the feed roll, and means for accelerating the feed roll after the blank margin has been pressed against it.

3. In an envelope machine, in combination, means for supporting a stack of blanks, a main feed roll, means for separating a margin of an end blank of the stack and moving it substantially against the main feed roll, means for accelerating the feed roll after the blank margin has been pressed against it, an auxiliary feed roll riding on the periphery of the main feed roll, means pivoted co-axially with the main feed roll for supporting the auxiliary feed roll, and means acting in time with the separating means to swing the auxiliary feed roll support into position to cause the auxiliary feed roll to press the blank margin against the main feed roll.

4. In a machine of the class described, in combination, means for supporting a stack of apertured blanks, said apertures being in registry with each other, a feeder for removing blanks serially from said stack by sliding the end blank of the stack relatively to the remainder of the stack, and a stripper for preventing the marginal edge of the blank which is being removed from catching on the marginal edge of the window of another blank, said stripper comprising a body having substantially the contour of said apertures and held in erect position by the walls of the apertures, one end of said body terminating in a lip covering that edge of the aperture which is following with respect to the direction of withdrawal of the blank, the other end of the body being shaped to permit ready replacement of blanks substantially co-axially with the apertures of the stack components.

5. A machine of the class described, comprising means for supporting a stack of apertured blanks and a stripper combined and cooperating as set forth in claim 4, the body of said stripper being further characterized by having a bevelled heel past the inclined surface of which the following edge of the said window opening is directed automatically by transverse movement of the blank, and thereby said following edge is caused to be separated from the next adjacent blank.

6. A stripper member for controlling the feed of windowed blanks from a stack thereof having window openings in registry with each other, said stripper comprising a body with a cross-section in substantial correspondence with the contour of the window openings and having a lip extending from one end of the body so as to overlie the following edge of a window aperture in a blank being withdrawn from said stack.

7. A stripper member for controlling the feed of windowed blanks from a stack thereof having window openings in registry with each other, said stripper comprising a body with a cross-section in substantial correspondence with the contour of the window openings and having a lip extending from one end of the body so as to overlie the following edge of a window aperture in a blank being withdrawn from said stack, the adjacent end portion of the body being cut away to form a heel adapted to engage the following edge of said last-named window aperture to direct it under said lip, as the blank is withdrawn.

8. A device for facilitating transverse separation of contiguous blanks from the bottom of a stack of such blanks having window openings in aligned arrangement; said device comprising a stripper member having a body adapted to extend from the bottom of the stack through said aligned window openings, said body having a lip adapted to project from the lower end of said body over an adjacent edge of the window openings of the lowermost blank to be removed, said lip constituting means whereby the following edge of said window opening is separated from the next adjacent blank.

9. The combination with a support for a stack of blanks having window openings, of a device for facilitating transverse separation of contiguous blanks from the bottom of said stack of such blanks, said device comprising a stripper member having a body adapted to extend outwardly from said support through said aligned window openings, said body having a lip adapted to project from the lower end of said body over an adjacent edge of the window opening of the lowermost blank to be removed, said lip constituting means whereby the following edge of said window opening is separated from the next adjacent blank; said body deriving its lateral support from the surrounding window edges.

ABRAHAM NOVICK.